(12) United States Patent
Yamaguchi et al.

(10) Patent No.: US 11,514,172 B2
(45) Date of Patent: Nov. 29, 2022

(54) SYSTEM AND METHOD FOR INFORMATION FLOW ANALYSIS OF APPLICATION CODE

(71) Applicant: ShiftLeft Inc, Santa Clara, CA (US)

(72) Inventors: Fabian Yamaguchi, Berlin (DE); Markus Lottmann, Berlin (DE); Niko Schmidt, Berlin (DE); Vlad A Ionescu, Menlo Park, CA (US); Chetan Conikee, Santa Clara, CA (US)

(73) Assignee: Grabango Co., Berkeley, CA (US)

( * ) Notice: Subject to any disclaimer, the term of this patent is extended or adjusted under 35 U.S.C. 154(b) by 262 days.

(21) Appl. No.: 16/685,301

(22) Filed: Nov. 15, 2019

(65) Prior Publication Data
US 2020/0159934 A1 May 21, 2020

Related U.S. Application Data

(60) Provisional application No. 62/768,032, filed on Nov. 15, 2018.

(51) Int. Cl.
*G06F 21/00* (2013.01)
*G06F 21/57* (2013.01)
*G06F 16/901* (2019.01)
*G06F 21/56* (2013.01)

(52) U.S. Cl.
CPC ........ *G06F 21/577* (2013.01); *G06F 16/9024* (2019.01); *G06F 21/563* (2013.01); *G06F 2221/033* (2013.01)

(58) Field of Classification Search
CPC ... G06F 16/9024; G06F 21/563; G06F 21/577
See application file for complete search history.

(56) References Cited

U.S. PATENT DOCUMENTS

| 5,950,003 A | 9/1999 | Kaneshiro et al. |
| 9,280,442 B1 | 3/2016 | Nicolo |
| 9,652,358 B1 | 5/2017 | Spoon |

(Continued)

FOREIGN PATENT DOCUMENTS

CN 100461132 C 2/2009

OTHER PUBLICATIONS

Amaguchi, Fabian, "Modeling and Discovering Vulnerabilities with Code Property Graphs", University of Gottingen, Germany, Qualcomm Research Germany, Feb. 2, 2015, "https://www.researchgate.net/publication/263658395_Modeling_and_Discovering_Vulnerabilities_with_Code_Property_Graphs".*

(Continued)

*Primary Examiner* — Jeffrey C Pwu
*Assistant Examiner* — Thong P Truong
(74) *Attorney, Agent, or Firm* — Alpine Patents LLC; Brian Van Osdol

(57) ABSTRACT

A method and system for security flow analysis of application code comprising: detecting data flows in a code base; and extracting an information flow, comprising determining a primary data flow by identifying a data flow that contains exposed data, and extending the primary data flow through descriptor data flows, wherein the descriptor data flows are associated with the set of data tracked by the primary data flow; wherein the information flow is a high level flow description that exposes the application code vulnerabilities based on the primary data flow and all associated descriptor data flows.

20 Claims, 11 Drawing Sheets

(56) References Cited

U.S. PATENT DOCUMENTS

| | | |
|---|---|---|
| 9,658,835 B1 | 5/2017 | Venkataramani |
| 10,515,212 B1 | 12/2019 | McClintock et al. |
| 2007/0240138 A1 | 10/2007 | Chess et al. |
| 2008/0256518 A1 | 10/2008 | Aoshima et al. |
| 2009/0307664 A1 | 12/2009 | Huuck et al. |
| 2010/0017868 A1 | 1/2010 | Hao et al. |
| 2010/0083240 A1 | 4/2010 | Siman |
| 2010/0192220 A1 | 7/2010 | Heizmann et al. |
| 2011/0083190 A1 | 4/2011 | Brown et al. |
| 2012/0102474 A1 | 4/2012 | Artzi et al. |
| 2013/0031531 A1 | 1/2013 | Keynes et al. |
| 2013/0160130 A1 | 6/2013 | Mendelev et al. |
| 2014/0019490 A1 | 1/2014 | Roy et al. |
| 2014/0143827 A1 | 5/2014 | Edery et al. |
| 2014/0282853 A1 | 9/2014 | Velammal et al. |
| 2016/0224790 A1 | 8/2016 | Gupta |
| 2016/0352769 A1 | 12/2016 | Bryant et al. |
| 2017/0063910 A1 | 3/2017 | Muddu et al. |
| 2017/0091470 A1 | 3/2017 | Infante-Lopez |
| 2017/0206082 A1 | 7/2017 | Abadi et al. |
| 2017/0316202 A1 | 11/2017 | Roichman |
| 2018/0349614 A1 | 12/2018 | Ionescu et al. |
| 2019/0005163 A1 | 1/2019 | Farrell et al. |
| 2019/0108342 A1 | 4/2019 | Conikee et al. |
| 2019/0171846 A1 | 6/2019 | Conikee et al. |

OTHER PUBLICATIONS

Yamaguchi, Fabian, "Modeling and Discovering Vulnerabilities with Code Property Graphs", University of Gottingen, Germany, Qualcomm Research Germany, Feb. 2, 2015, "https://www.researchgate.net/publication/263658395_Modeling_and_Discovering_Vulnerabilities_with_Code_Property_Graphs".

* cited by examiner

```
1   @RequestMapping(value = "/handler", method = "POST")
2   public void httpHandler(HttpServletRequest request,
3                  HttpServletResponse response)
4   {
5     //...
6     InputStream is = request.getInputStream();
7     DataInputSteam in = new DataInputSteam(is);
8     response.setContentType("text/html")
9     OutputStream out = response.getOutputStream();
10
11    byte[] byteArray = new byte[8];
12    int length;
13    while ((length = in.read(byteArray)) != -1)) {
14      transform(byteArray);
15      out.write(byteArray, 0, length);
16    }
17    //...
18  }
```

FIGURE 3

```
⟨Directive⟩  ::= ⟨Exposed⟩ | ⟨Io⟩ | ⟨Transformer⟩
⟨Exposed⟩    ::= 'EXPOSED' ⟨TagAssign⟩
⟨Io⟩         ::= 'IO' ⟨TagAssign⟩
⟨Transformer⟩::= 'TRANSFORMER' ⟨TagAssign⟩
⟨TagAssign⟩  ::= tag '=' ⟨Method⟩
⟨Method⟩     ::= METHOD name [⟨Param⟩]
⟨Param⟩      ::= '' ⟨ParamSpec⟩ ':' ⟨ParamType⟩ ''
⟨ParamSpec⟩  ::= ('PAR'.num)| 'INST' | 'RET'
⟨ParamType⟩  ::= 'SRC'|'SNK'| 'D SRC' | 'D SNK'
```

FIGURE 7

```
IO    stream = METHOD "InputStream.read(byte [])"
      {PAR1 : "SRC", INST : "D SNK"}
IO    stream = METHOD "OutputStream . write ( byte [] , int , int )"
      { PAR1 : "SNK"}
IO    http = METHOD " HttpServletRequest . getInputStream "
      { RET : "D SRC" }
IO    http = METHOD "HttpServletResponse . getOutputStream"
      { RET : "D SRC" }
IO    cnt = METHOD " HttpServletResponse . setContentType ( String)"
      { PAR1: "D SNK", RET : "D SRC" }

TRANSFORM encode = METHOD "transform(byte [])
      {RET : "SNK", PAR1 : "SRC" }
EXPOSED http = METHOD "httpHandler(HttpServletRequest ,
HttpServletResponse )"
      { PAR1 : "SRC", PAR2 : "SNK" }
```

FIGURE 8

1: function EXECUTEFLOW$((v_1,\ldots,v_n))$
2:     res ← []
3:     acc ← ∅
4:     for $i = 1$ to $n$ do
5:        res += $(\mathcal{M}(v_i),$ JOIN(acc, $\mathcal{P}(v_i)))$
6: function JOIN$(t_1, t_2)$
7:     r ← $\{(k, -v) \in t_2 | (k, v) \in t_1\}$
8: return $(t_1 \cup t_2) \setminus r$

FIGURE 10

```
CONCLUSION x s s = FLOW
     IO (http)
  -> DATA (NOT escaped AND cnt=text-html)
  -> IO (http)
```

FIGURE 11

SYSTEM AND METHOD FOR INFORMATION FLOW ANALYSIS OF APPLICATION CODE

CROSS-REFERENCE TO RELATED APPLICATIONS

This application claims the benefit of U.S. Provisional Application No. 62/768,032, filed on 15 Nov. 2018, which is incorporated in its entirety by this reference.

TECHNICAL FIELD

This invention relates generally to the field of data security vulnerability field, and more specifically to a new and useful system and method for information flow analysis of application code.

BACKGROUND

Contemporary cloud application development processes encourage fast delivery of features and fixes in response to customer demands and application monitoring. The increased pace at which code is continuously integrated and deployed is not without risk, as security testing is bound to fall short in the process. Vulnerabilities missed during development remain a core ingredient in data breaches, enabling attackers to obtain sensitive user information even from cloud vendors that invest in security.

Unfortunately, existing approaches for vulnerability discovery are not immediately applicable in this setting and are often accompanied by various downsides.

Dynamic approaches for program analysis are often limited to vulnerability detection that is dependent on observable failures at runtime. Additionally, dynamic approaches commonly suffer from low code coverage and are involve non-trivial integration into a development process. Approaches that involve static taint tracking and symbolic execution similarly have issues. For example, they can suffer from being prohibitive in a runtime and/or result in a high number of false positives for vulnerability detection.

Thus, there is a need in the data security vulnerability field to create a new and useful system and method for information flow analysis of application code. This invention provides such a new and useful system and method.

BRIEF DESCRIPTION OF THE FIGURES

FIG. 3 is a code example for a cross site scripting vulnerability in an application;

FIG. 7 is a code example of a grammar for high-level tagging directives;

FIG. 8 is a code example of tagging directives for the cross site scripting vulnerability example;

FIG. 10 is a code example of flow description for the cross site scripting vulnerability example;

FIG. 11 is a code example of a process for flow execution;

DESCRIPTION OF THE EMBODIMENTS

The following description of the embodiments of the invention is not intended to limit the invention to these embodiments but rather to enable a person skilled in the art to make and use this invention.

1. Overview

A system and method for security analysis of application code of a preferred embodiment functions to process data flow in coordination with a security code policy to extract the high-level abstraction of information flow. The system and method preferably extract a set of information flows of an application, which can be used in vulnerability detection in addition to providing details for code analytics. In some implementations (e.g. software development), the system and method may be used for the continuous discovery of software vulnerabilities.

Each information flow is preferably a high-level flow model of multiple data flows that traces a vulnerable set of data through either the entire application code, or through a specified domain of the code. The set of information flows may be the full set of information flows present in the application code. The set of information flows may alternatively be a high level flow model of subset or a portion of the set of data flows from the application codet, which may be targeted at the significant information flows or those satisfying some pattern or possessing some property. The system and method may additionally implement a graph modelling technique using semantic code property graphs, to map the data flows and the information flows to optimize analysis of the application code. The resulting information flow analysis as determined by the system and method can be used to provide richer interpretation of the application operation, which can be applied in a variety of ways.

Figure 1:
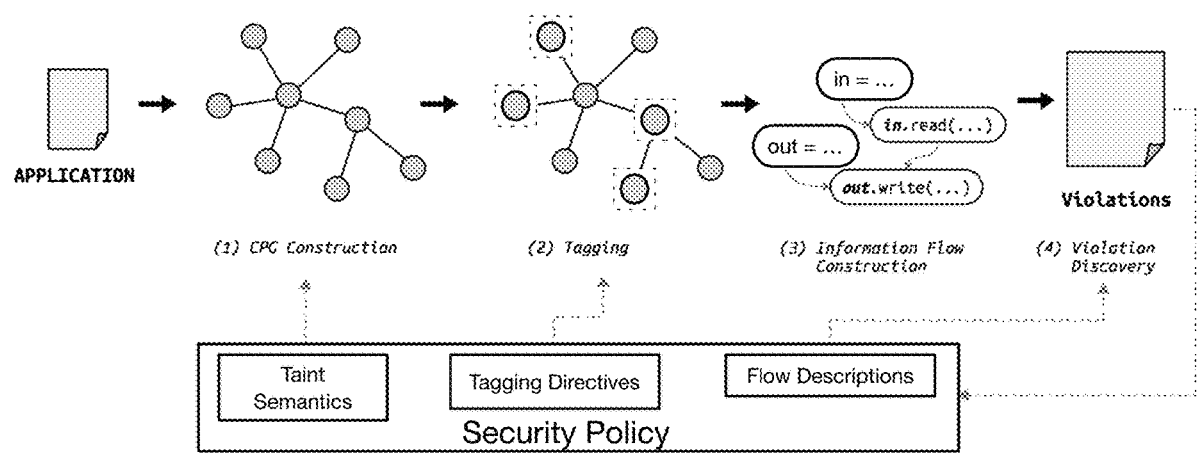
FIG. 1 is a schematic representation of a system of a preferred embodiment applying a security policy.

In one preferred application of the system and method, as shown in FIG. 1, the system and method may be used in combination with a code security policy for the detection of code policy violations. The code policy violations may generally be linked to undesired code practices or potential code vulnerabilities. This may be used in detecting vulnerabilities in a code base during development/deployment. This may additionally be used in evaluating third-party code bases such as open source software.

The system and method are particularly applicable to vulnerability discovery in a manner suitable for continuous integration and deployment. The system and method are preferably used in detecting and analyzing high-level information flows across a code base, which may include core application code of a development team as well as used libraries, frameworks, and in some cases even services. Accordingly, the system and method facilitate information flow analysis across the code base. The information flow analysis can be used in continuously monitoring code for violations of a security policy during the development process. The information flow analysis may alternatively be performed periodically or at select moments. Policy rules may, for example, be employed to enforce escaping of HTTP input parameters before allowing their use in database queries, to prohibit attacker-controlled strings into a database or system commands, to prohibit flows of sensitive information into log files, to prohibit passing of environment information to a logging service, and/or to enforce any suitable code policy.

The system and method may be implemented as part of a security tool. The security tool is preferably used in the software development lifecycle (SDLC). The security tool may additionally be used or applied for runtime execution during deployment. The system and method is preferably implemented in combination with a code analysis engine that has access to an application code base. Herein, the examples of the system and method are primarily directed at Java-based applications, but the system and method are in no way limited to Java-based applications, and the system and method may be used with any suitable type of application, particularly for applications written in either static, dynamic or type inferenced programming language.

The system and method may offer a number of potential benefits, some of which are mentioned herein. These benefits in no way are intended to limit the system and method.

As one potential benefit, the system and method function to provide a richer understanding how data is created, updated, deleted, transferred and used within a software system. The system and method can provide insight into how data flows and is transformed beyond a basic understanding of the source and sink as may be obtained through traditional data flow analysis. The system and method facilitate construction of a higher-level model that can interpret a group of data flow interactions in the form of an information flow. Sources and sinks can be interpreted across data flows using associated descriptor flows. Information flow analysis can additionally interpret data transformations.

As another potential benefit, the system and method can work across framework abstractions. The system and method can enable library and framework annotation such that the information flow analysis can operate for application code bases making use of various libraries and frameworks utilized by the application.

As another potential benefit, the system and method can facilitate enforcement of code-level security policies. The system and method preferably evaluate code-level security policies on high-level information flows in order to regulate information flows.

As a related benefit, the system and method can enable a substantially high true positive rate and low false positive rate. This can be true even for applications developed with a large number of outside libraries with mixed security practices.

As another potential benefit, the system and method provide significant benchmark improvements over competing software analysis software. The OWASP Benchmark suite is an industry standard for benchmarking speed, accuracy, and precision of vulnerability detection. With a Youden-Index of 75% on average, the system and method significantly outperforms existing static analyzers. On version 1.2 of the benchmark, an exemplary implementation of system and method outperforms FB-wfindsecbugs and SonarQube with a true positive rate that is 3% and 50% higher, at a false positive rate that is 33% and 42% higher.

2. Method

Figure 2:
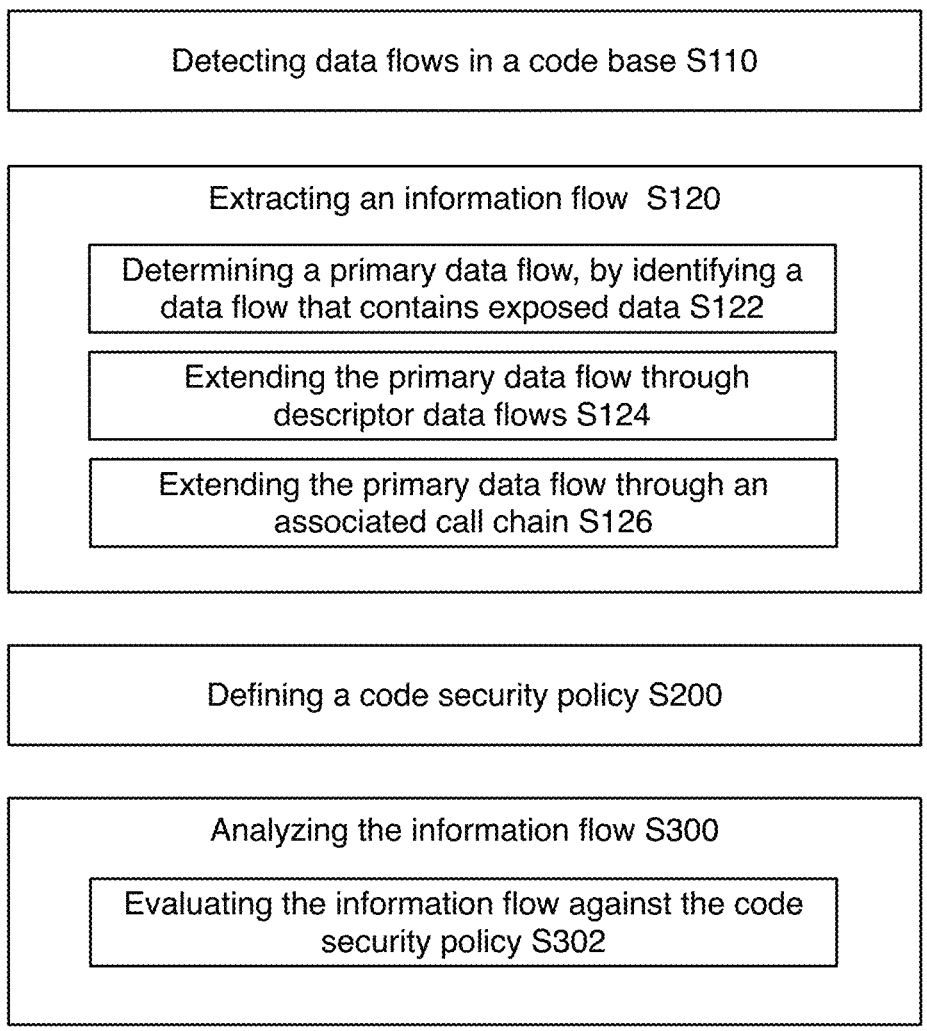
FIG. 2 is a flow diagram of a method of a preferred embodiment.

As shown in FIG. 2, a method for security flow analysis of application code of a preferred embodiment includes circuitry utilized in: detecting data flows in a code base S110, wherein detecting a data flow comprises tracking a set of data through the code base; and extracting an information flow S120. Extracting an information flow S120 preferably includes: determining a primary data flow, by identifying a data flow that contains exposed data S122, and extending the primary data flow through descriptor data flows S124, wherein a descriptor data flow is a data flow that is associated with the set of data tracked by the primary data flow. The method preferably functions to provide an in-depth analysis of an application by tracing data and data structures (i.e. flows) through the application code base, prior to execution of the application. The information flows may serve as an actionable analysis result where presentation of the information flows serves as a useful and transformative representation of the code base for an application. Developers and/or security managers may use the resulting information flow analysis in altering practices.

In some preferred variations, the method may further include analyzing the information flow S300, wherein analyzing the information flow includes detecting data vulnerabilities. In these variations, the method may additionally include: defining a code security policy S200, wherein the code security policy comprises policies used in evaluating the information flow; and detecting data vulnerabilities may further include evaluating the information flow against the code security policy S302. In these variations, the method further functions to provide a security analysis of the application and thus identify potential vulnerabilities of the application and the application code, and potentially provide actions to ameliorate the potential vulnerabilities. Additionally, this variation of the method provides a set of security policies to provide continuous analysis of the application and application code.

The method may be generally implemented on the code base of any application code, written in any language that has, or can, implement the code property graph; in any desired level and/or varying scope. In one preferred variation, the method may be implemented in full on the code base of an application or service. In this variation all data flows in the code base may be processed for detection of data flows and information flows across the entire code base can be extracted. In another preferred variation, the method is implemented on a subset of the code base, e.g. on a subset of the codebase created by an external developer. In another preferred variation, the method may be implemented on public code libraries, providing an in-depth analysis for an application that utilizes those libraries.

The method may additionally or alternatively be implemented in varying degrees and/or multiple times in one or more sources of application code. For example, the method may be implemented for an in-depth vulnerability analysis of the public code libraries, while the method is simultaneously implemented on a locally generated region of the code base to just extract the information flows and detect how these information flows are connected to the vulnerabilities in the code libraries. Generally speaking, the method may be implemented in any desired varying degree on any desired region of the application code base. Furthermore, the higher-level data modeling of one source of application code may be used to augment the analysis and processing of an associated or integrated second source of application code. In one variation, a first private code base can have information flow information, data flow information, and/or other extracted code modeling used to augment analysis and interpretation of a second code base without the first code base needing to reveal underlying source code to the developers of the second code base. In one example, a first private code base may have information flow information, data flow information and other code modeling that pertains to the code base's use of common, open source code bases.

To present a detailed implementation of the method, an illustration of the implementation on an entire code base is presented. A cross site scripting vulnerability example in an application based on the Spring Web framework, as shown in FIG. 3, is generally used throughout the description of the method. Details of this example are presented as way of example and in no way are intended to limit the method and can generally be used across a wide variety of vulnerabilities.

In this example, shown in FIG. 3, a method named httpHandler is defined (line 2) which handles incoming HTTP POST requests, as indicated by the RequestMapping framework annotation (line 1). The method has two parameters: a HTTP request (request) and an HTTP response (response) that is to be initialized by the method. Ultimately, httpHandler reads data from the request body (line 13), transforms it via a custom routine, and writes the result into the response body (line 15). However, as is common for Java-based programs, the read and write operations causing data transfer are methods defined on generic stream types. Examination of the streams initialization and configuration can be used to comprehend that these streams represent HTTP requests and responses. In the example, the input stream in is known to serve data from an HTTP request body because it is initialized via a call to the method getInputStream on an HttpServletRequest object (line 6). Similarly, the output stream is initialized via a call to getOutputStream on the variable response of type HttpServletResponse (line 9), and response is configured to provide content of type "text/html" with a call to setContentType (line 8), a necessary a condition for the existence of the cross-site scripting vulnerability. The method can address at least three challenges in monitoring vulnerabilities with this example, namely handing framework abstractions, custom transformations and combinations of multiple data flows.

Figure 4:
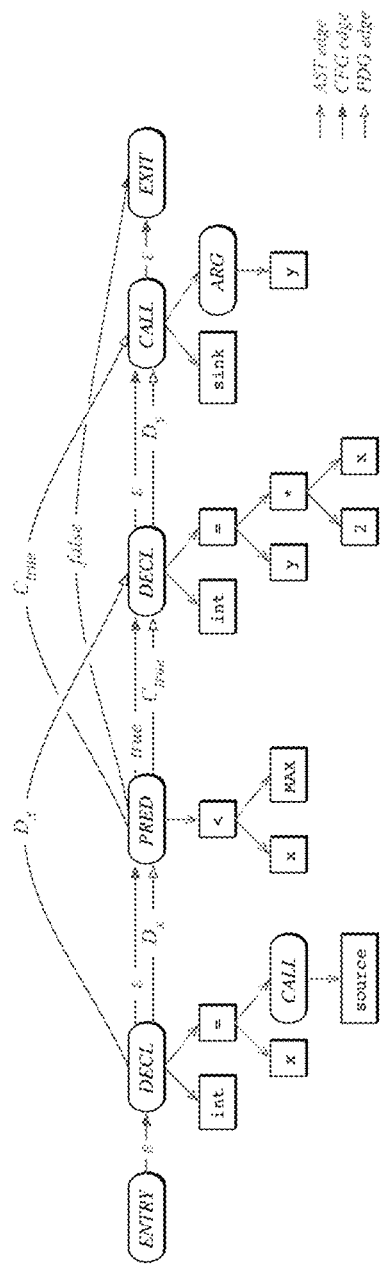
FIG. 4 is a schematic representation of a code property graph of a preferred embodiment.

In preferred variations, data flows are constructed fully, or in part, as a code property graph (CPG). As shown in FIG. 4, the CPG is preferably a joint data structure or model characterizing the code base. Accordingly, detecting data flows S110 may include or relate to extracting a CPG; extracting an information flow S120 may additionally or alternatively include or relate to extracting a CPG; and in variations where it is included, analyzing the information flow S300, may additionally or alternatively include or relate to extracting a CPG. Alternatively, data may be tracked and/or stored in non-graph like data structure(s).

More broadly, the method involves forming a code profile. The code profile functions as a manifest interpretation of the components of the code that can have security and functional implications. The code profile is preferably generated from the CPG, but may be generated through other means. Code analysis and interpretation can detect certain parts of the code that have some implications on the data type, handling of data, and interactions with outside systems or code. The code profile can preferably be broken down into a set of components that in combination can encapsulate the attack surface of the code.

The code profile is preferably generated for a particular scope of the base code. But code profiles could additionally exist for subcomponents. For example, different classes or modules used in an application may have their own code profiles in addition or as an alternative to the code profile of the base code. A nested hierarchy of code profiles can enable someone to see how parts of a codebase impact a higher order code profile.

In variations where a CPG is implemented for flow tracking, the CPG preferably enables efficient processing and analysis of the codebase. The CPG is preferably a serializable data structure which can enable efficient transmission and distribution of the code profile across various machines. Efficient transmission of the code profile may enable parallel processing of the CPG, which can be leveraged in efficient traversal of the CPG in analysis of interaction flows between various points of interest in the codebase. The CPG can additionally be established for different segments of the codebase. For example, libraries and/or subcomponents of a codebase may each have a CPG.

Figure 5:
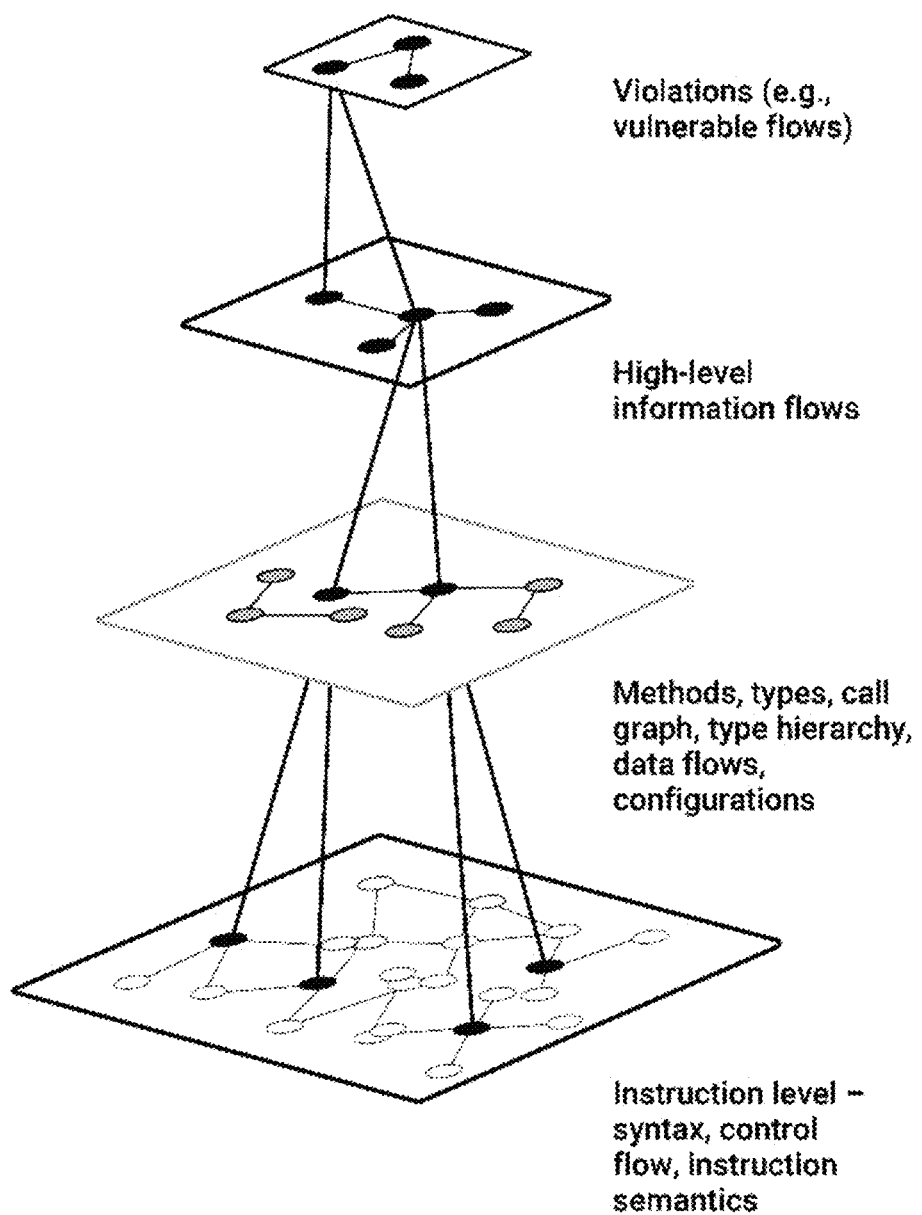
FIG. 5 is a schematic representation of the abstraction layers of a code property graph of a preferred embodiment.

As shown in FIG. 5, in some preferred variations the CPG may comprise different "layers", wherein each layer characterizes the code base at a different level of abstraction. For example, in one implementation the CPG may include a base layer, comprising individual data flows; a graph layer, comprising nodes data flow links to the base layer; an information flow layer, comprising information flows; and a finding layer, comprising an analysis of the information flow layer. In a first alternate variation, the CPG may have fewer or additional layers as desired. In a second alternate variation, each layer of the CPG is a distinct and disjoint data structure. In a third alternate variation, multiple CPGs may be implemented, wherein each CPG provides analysis of a section of the code base. In this third variation, each CPG may or may not overlap with other CPGs.

In one preferred implementation, elements of the code property graph are composed of an abstract syntax tree (AST), a control flow graph (CFG), and/or a data flow graph (DFG). Thus, constructing a code property graph (CPG) can include extracting an AST, a CFG, and a DFG from the code base; and then assembling the code property graph from AST, CFG, and DFG. In this preferred implementation, the AST, CFG, and DFG are each graphs that, in one implementation, can be joined through statement nodes. Alternatively, the code property graph may be constructed of a DFG. This use of a code property graph or a code related graph such as described herein are variations of possible implementations, and the method may alternatively make use of another suitable forms model of the code property graph or a code profile.

The data flows and the code profile can additionally be maintained with changes in the codebase. A versioning tool, such as git, could be integrated with the CPG extraction process wherein incremental changes in code could trigger updating the CPG for portions of the codebase impacted by the changes. These incremental updates can efficiently maintain a substantially updated representation of the codebase during development.

In some variations, the AST, CFG, and DFG are preferably combined into a joint data structure as the code property graph. The three graphs AST, CFG and DFG each have nodes that exist for each statement and predicate of the source code. The statement and predicate nodes can serve as a connection point of the three graphs when joining to form the code property graph. The code property graph preferably provides a data structure for the discovery of code that conforms to constraints imposed on syntax, control flow, and data flow.

Extracting a CPG or otherwise detecting a data flows can additionally include extracting across multiple integrated code bases. For example, a code base of an internal or external library could similarly be included in the code property graph.

An AST functions to characterize structure and syntax of the code. An AST may be a data structure that includes a tree representation of the abstract syntactic structure of the code base. Each node of the tree may denote a construct (e.g. function) occurring in the code base. Additionally, the AST may enable annotating/tagging every element it contains. A code parser can create an AST as an ordered tree where inner nodes represent operators and leaf nodes match operands.

The CFG functions to characterize the functional flow of execution within code. The CFG is a directed graph that includes the representation of all paths that may be traversed in the code base through execution of the application. The CFG can preferably represent sequential and/or possible sequences of execution. The CFG preferably characterizes the calls between functions in the code and/or the conditional branches within the code. For example, a statement preceding an 'if' statement will have an association into the if statement or over the if statement within the CFG. In some preferred variations, the CFG may be converted into a DFG, wherein the CFG representation of the code base is embedded in a DFG.

The DFG functions to show the operations and statements that operate on particular pieces of data. The DFG is a preferably a directed graph in which assignments and reference to variables are represented by the nodes. The "data flow" is represented by traversing the edges of the graph and can indicate the flow of data. The DFG can additionally capture possible operations and methods. In some variations, a CFG may be captured within a DFG implementation.

In one preferred implementation, data is constructed on a semantic code property graph (SCPG). The SCPG preferably functions to isolate the specification of the effects program statements have on data flow into configurable data flow semantics. The SCPG can be a mechanism for reviewing detailed operational details such as how to describe propagation of attacker control. As per the CPG, any, and/or all, method steps may include or relate to extracting a SCPG.

Similar to the code property graph, the SCPG can combine multiple views of code into a single data structure. A SCPG will preferably enhance the characterization of a code base through two aspects. First, the SCPG interprets the original CPG as the base layer of a multi-layered program representation, wherein each layer provides a more abstract view on the program code. Second, the SCPG specifies with greater detail how program statements are represented in a level of detail sufficient to formulate an online data flow tracking algorithm on the graph. Additionally, the SCPG may be tagged by applying tags to nodes of the graph.

The original CPG is preferably constructed by merging abstract syntax trees, control flow graphs, and program dependence graphs into a joint representation, thereby providing a data structure for the discovery of code that conforms to constraints imposed on syntax, control flow and data flow. As one variation compared to the CPG, the SCPG may not include a program dependence graph but alternatively merges ASTs and CFGs. In this variation, the desired information for online data flow tracking is included in the graph via summary edges induced by data flow semantics, thereby creating a self-contained graph for language-neutral data flow tracking.

Figure 6:
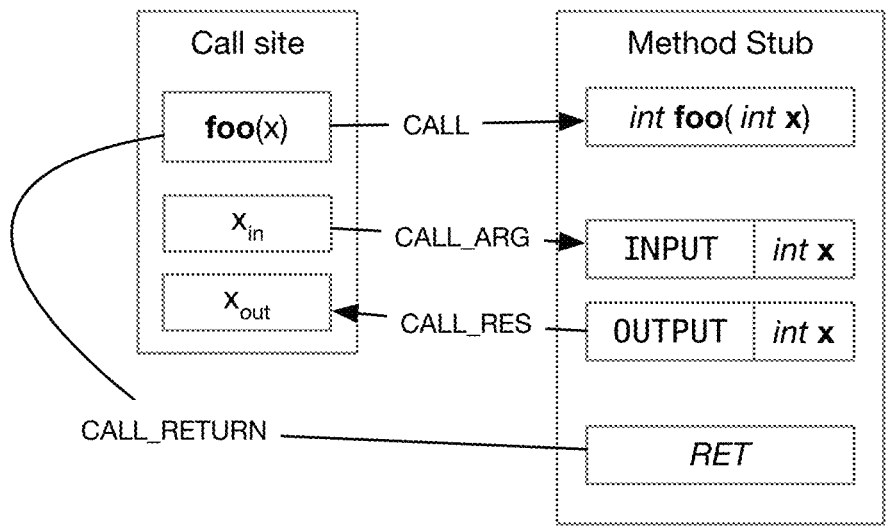
FIG. 6 is a schematic representation of an exemplary call site and method stub.

Additionally, the control flow graph included in the SCPG is preferably a control flow graph over call sites. That is, operations carried out by the program can be modeled as a function call sites, connected to method stubs of their callee. Preferably, the formal method signature of the callee can be represented by a designated node and an input and output parameter for each formal parameter. Finally, arguments and corresponding formal parameters are connected via directed edges to indicate passing of information from one to the other. As shown in FIG. 6, in one example, a call site and method stub may model passing of parameter x to the function foo. The call site may include a designated node to represent the overall call and the return value. Additionally, two nodes in this example may represent the argument of x so as to represent the state of x prior to and after the function has been executed.

In one preferred variation, data flow semantics may be used in characterizing information in the security policy around how data (e.g., taint) is propagated from input parameters to output parameters to implement static data flow tracking.

A data flow semantics can be a three tuple (f,s,d) where f is a globally unique function identifier, s identifies input parameters, and d identifies output/return parameters. The tuple indicates that, for the method f, taint is propagated from the input parameters to the output parameters d. The data flow semantics are preferably the collection of these rules. In one variation a mini-language may be used to represent a data flow semantic rule, but a data flow semantics may be represented in any suitable manner. In one preferred implementation, the mini-language may be a custom domain specific language (e.g. polyLang).

As an example, the cross-site scripting vulnerability example can be represented by data flow semantics. As shown in FIG. 6, the first line states that, if the first parameter (PAR1) of the DataInputStream constructor is tainted, then so is the instance output parameter (INST). The second line similarly states that taint of the first parameter of transform is propagated to the return value (RET). If the code of transform is available, then this summary may be calculated automatically and need not be specified by the user. If however, the user feels that the transform carried out by transform is sufficient to remove attacker control, this line can be omitted and the flow from input to output stream will cease to exist. Analysis of the transform may be performed automatically. For example, various routine transforms such as encoding operations, hash operations, obfuscation operations, and/or any suitable type of transform may be recognized and automatically used to prevent a data security vulnerability.

In some preferred implementations, the method, in connection to detecting data flows S110, extracting information flow S120, and defining a code security policy S200; may include applying annotations to the code profile. More specifically, as shown in FIG. 1, the applying annotations to the code profile may be the "tagging" of nodes of the SCPG and in particular the nodes that represent methods and parameters. In one preferred example, an annotation (or "tag") is preferably a key-value pair (k, v), where k is an element from a key space, and v is a string.

The application of annotations is preferably used to provide additional information and context around attacker control and sensitive operations. This may be application and/or organization specific. Code profile annotations may be performed automatically, semi-automatically, and/or be performed manually. In the case of a manually annotated code profile, a set of tagging directives may be received, retrieved, or otherwise provided as part of the security profile. In one implementation, a set of libraries and frameworks are pre-analyzed to have a set of tagging directives.

Preferably, annotations can be applied to exposed functions, read operations, write operations, transformations, and descriptors.

Exposed functions that are annotated may include those that can be triggered by the attacker (e.g., HTTP and RPC handlers). Parameters of the exposed functions that may be attacker controlled are preferably annotated.

Read operations that are annotated may include those that introduce data into the application (e.g., read operations on streams or database handles). The corresponding output parameters holding read data are additionally annotated.

Write operations that are annotated may include those that write or transmit data to storage or other components. The input parameters holding the transmitted data are preferably tagged. Examples of annotated write operations may include functions that emit database queries, specify a resource handler, or write data to a file.

Transformations that are annotated may include functions that transform data, the input parameter they transform, and the output parameter holding the transformed data are tagged. For example, the instance parameter of a read operation on a data stream is a descriptor, as is the filename in a file-open operation. Examples of transformations that may be annotated include: encodings, encryptions, and sanitization routines.

Descriptors that are annotated may include parameters of read operations, write operations, and/or transformations that configure method behavior. For example, the instance parameter of a read operation on a data stream can be a tagged descriptor. In another example, the filename in a file-open operation can be an annotated descriptor.

Tagging directives are preferably rules that encode the annotation of methods and parameters. In variations that include defining a code security policy S200, the tagging directives are preferably included in the security policy. In one exemplary implementation, an annotation language (e.g. polyLang) and simplified grammar may be used to specify a tagging directive, but any suitable approach may be used. A shown in FIG. 7, an exemplary grammar may introduce three types of directives: "EXPOSED: directives for tagging exposed functions, "IO" to tag read and write operations, and "TRANSFORMER" to tag transformations. Each of these directives can specify a method via its unique name, optionally allows parameters to be marked as sources (SRC), sinks (SNK), descriptor sources (D SRC) and descriptor sinks (D SNK). Additionally, language functionality for the tagging directives can enable annotating tag parameters via criteria different from the method name such as a result of method or parameter annotations, or parameter types.

As another example, FIG. 8 shows the tagging directives relevant for the discovery of the sample vulnerability of the cross-site scripting vulnerability example. In this example, first parameter of the method InputStream.read is marked as a data source, while its instance parameter is marked as a descriptor sink (D SNK), indicating that it is necessary to take into account flows into the instance parameter in order to determine where data is originating.

The method OutputStream.write is marked as a write operation accordingly by specifying that its first input parameter is a sink. Analogously to the read method's instance parameter, the write method's instance parameter is marked as a descriptor sink. Then both the input and output streams returned by HttpServletRequest and HttpServletResponse respectively are specified to be labeled as http. This can facilitate recovering that data propagates from HTTP to HTTP in the running example. Then the transform can be specified as performing an encoding via the TRANSFORM directive. This may allow determination of whether encoding is taking part of the data flow in flow descriptions. This may be optional since data-flow semantic for the transform was provided in example FIG. 7. Finally, the method httpHandler can be tagged as exposed to indicate that attackers can trigger it from the outside. In practice, this tagging may be performed for all methods annotated with the RequestMapping annotation. Other suitable approaches may alternatively be used.

Block S110, which includes detecting data flows in a code base, preferably functions to construct a base model (or base layer) of the application code with a data flow perspective. In preferred variations, detecting data flows in a code base S110 creates data flow graphs, wherein each data flow graph shows the operations and statements that operate on particular pieces of data (i.e. sets of data). Preferably, detecting data flows in a code base S110 starts at a sink and detects the flow to the source, but may alternatively start from the source and go to the sink. In other variations, detecting the data flow may trace the flow in multiple regions of the same flow simultaneously. Simultaneous tracing may happen in either direction. In one preferred implementation, detecting data flows in a code base S110 includes creating a directed graph. In this implementation, a data flow may be created for each set of data identified in the code base, wherein assignments and references to variables from the set of data are represented as nodes. As mentioned previously, in preferred variations detecting data flows S110 may include or relate to extracting a base layer CPG and/or SCPG; and mapping individual data flows as nodes onto the graph layer, linked to the base layer.

Block S120, which includes extracting an information flow, preferably functions to process the data flow graph of the code base to form a higher-level interpretation in the form of an information flow; potentially exposing vulnerabilities in the application code. The information flow may reveal a number of additional details of the operation of the code base. In one variation, relationships beyond data flows, such as relationships to data flows, may provide a more detailed descriptive modeling of the information flow. In another variation, extracting the information flow S120 may involve modeling of data transformations within data flows associated with the interaction flow, which functions to interpret the types of transformations (e.g., encoding, obfuscating, hashing, etc.). In preferred variations, extracting information flow S120 may include or relate to extracting an information layer CPG and/or SCPG; that is, mapping information flows and linking them to associated data flows.

In preferred variations, the information flow is a model of a combination of data flows associated with a set of data from the code base. Thus, extracting the information flow S120 preferably includes determining a primary data flow by identifying a data flow that contains exposed data S122; and extending the primary data flow through descriptor data flows S124, wherein the descriptor data flows S124 are data flows associated with the set of data tracked by the primary data flow. In some preferred variations, the data flow semantics and tagging directives applied to the CPG can be used in combining multiple data flows and call chains into a logical information flow. A set of information flows can thus be established across the high-level operation of the application.

In a preferred implementation, block S120 includes determining a primary data flow S122—extending the primary data flow through descriptor data flows S124, and further include extending the primary data flow through an associated call chain S126. Extending the primary data flow through an associated call chain S126 may function to expose data vulnerabilities associated with the call chain. Extending the primary data flow through an associated call chain S126 may be seen in the exemplary process of FIG. 9.

Figure 9:
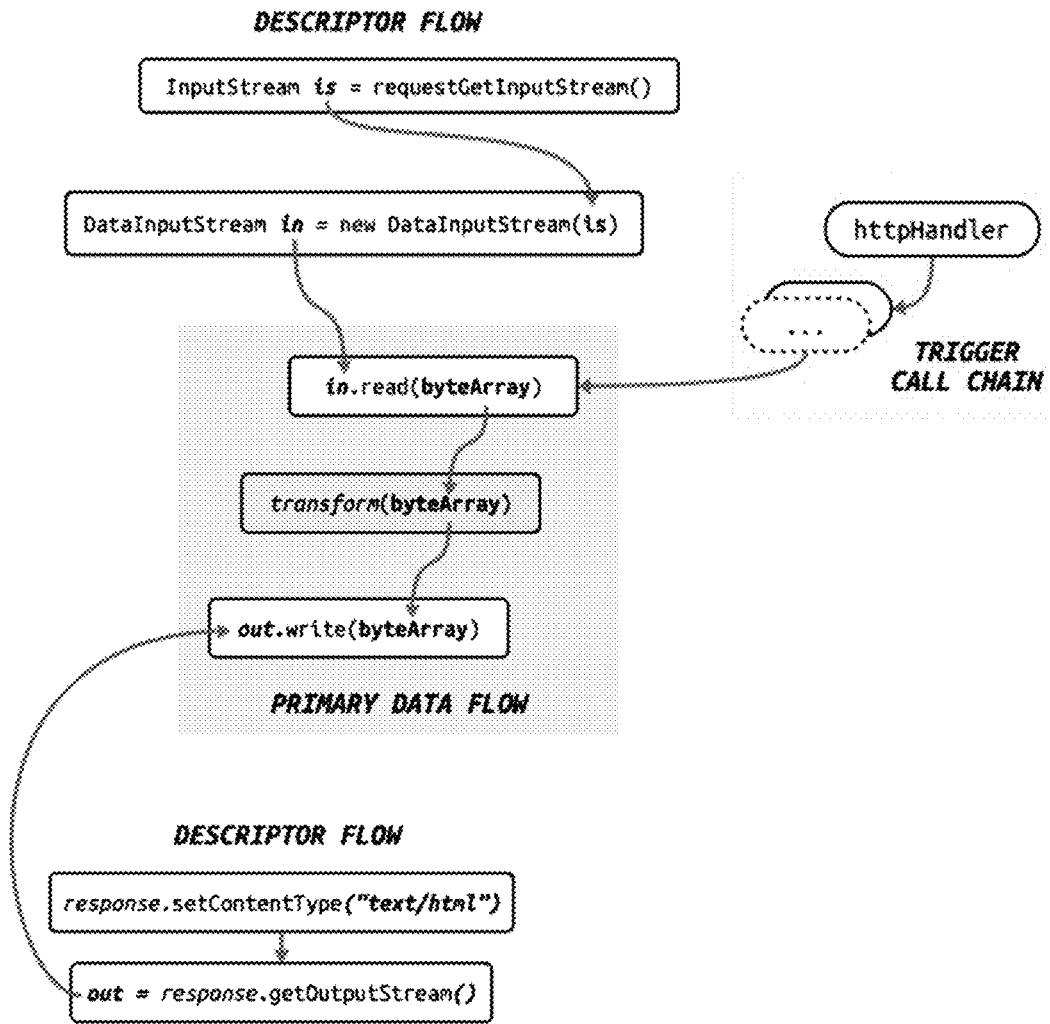
FIG. 9 is a schematic representation of an information flow for the cross site scripting vulnerability example.

In the example shown in FIG. 9, the character buffer byteArray in the primary data flow can be initialized by a call to read on the input stream in. The character buffer is subsequently written to the output stream out, after passing through the method transform. Both the input stream and the output stream can be initialized and configured through descriptor flows. The input and output stream are initialized to be return values of calls to getInputStream and getOutputStream on the classes HttpServletRequest and HttpServletResponse respectively. Moreover, 'response', the sink descriptor in the call to getOutputStream, can be configured through a call to setContentType. Finally, the exposed method httpHandler can directly call the read operation read, and therefore, a single trigger call chain containing the single function httpHandler is determined.

Block S122, which includes determining a primary data flow, preferably functions in identifying data flows that may have an exposed data (e.g. data that is attacker-controlled, or data that is considered highly sensitive). In preferred variations, once at least one primary data flow is identified, determining a primary data flow S122 further includes processing the set of primary data flows so as to form the basis for a set of information flows; wherein the set of information flows describe the flow of the application code to a desired level of understanding.

Determining a primary data flow S122 preferably includes identifying a data flow that contains exposed data. Exposed data preferably includes data, and/or data flows annotated or otherwise specified as relating to attacker-controlled data to a sensitive operation. Limiting information flow analysis to a subset of data flows susceptible to vulnerability (e.g. primary data flows and data flows associated with primary data flows) may promote better execution efficiency, but any suitable set of data flows may be processed. Each primary data flow preferably includes a data source, i.e. a set of data that may comprise any range of data (e.g. a single data variable, or a complex data structure). The set of data may be the output argument of a read operation or exposed method; a data sink, which may be the sink argument of a write operation, or an exposed output parameter; or a list of transformations.

Block S124, which includes extending the primary data flow through descriptor data flows, preferably functions to overcome the range of the primary data flow analysis; and preferably helps to identify the source and destination of the primary data flow. Descriptor data flows preferably comprise data flows associated with the source(s), destination(s), and/or transformation(s) of the primary data flow. That is, for one specified primary data flow, an associated descriptor data flow may comprise a data flow associated with a source, a destination, or a transformation in the set of data tracked by the primary data flow; wherein a primary data flow may have any number of descriptor data flows. Extending the primary data flow through a descriptor data flow S124 preferably includes, for each element of the primary data flow, determining the associated data flows that end in any of the sink descriptors of the primary data flow element. These associated data flows from the descriptor data flows, and preferably configure the element (e.g., the read operation, write operation, and/or transformation). Block S124 is preferably performed for each identified primary data flow.

In some variations, descriptor flows may be identified through code base annotations on the code profile. Annotations may be automated tagging descriptions of source, sink, or transformation component, or may be manual annotations to enable improved code analysis. For example, in some variations code libraries may be previously analyzed and annotated to improve identification and analysis of associated descriptor flows. In these variations, code analysis will be able to see these annotations. For example, annotations may enable identifying: file type (e.g. document), method function (e.g. write function), method components (e.g. end of a call chain), and transformations (e.g. encryption transformation).

In some preferred variations, extracting the information flow S120 further includes extending the primary data flow through an associated call chain S126. Extending the primary data flow through an associated call chain S126 preferably functions to identify a trigger for the data flow. For the source of the primary data flow, block S126 preferably includes determining the call chains leading to the invocation of the primary data flow. In the simplest case, the primary data flow starts at an exposed parameter, in which case the trigger call chain is of size one, containing only the exposed method.

Block S300, which includes analyzing the information flow, functions to perform analysis and gain knowledge from the information flow, or set of information flows. Analyzing the information flow S300 may include performance analysis, general detail analysis, detecting data vulnerabilities, and/or any other type of desired analyses. In an "informative" example, analyzing the information flow S300 may result in conveying to a user (e.g. through a user interface or report), information flow details of the code base. In one preferred variation, analyzing the information flow S300 comprises detecting data vulnerabilities.

Detecting data vulnerabilities may function to help determine vulnerabilities in the application code, and furthermore, help ascertain the potential danger of the vulnerabilities. Through analyzing the information flow S300, detecting data vulnerabilities may identify the location, type, the level of exposure, and the potential security risk of data vulnerability. Detecting data vulnerabilities may additionally identify other data vulnerability properties. In one example, detecting data vulnerabilities may include determining policy violations by evaluating flow descriptions of the information flows. This may be used during the software development lifecycle, which may function to present security alerts during the developmental process of the application. Detecting data vulnerabilities may alternatively be performed during runtime execution, through a runtime agent configured to trigger during execution and evaluate the state of information flows against a policy. In both static and dynamic implementations, the method may further include defining a code security policy S200 in conjunction to, or prior to, analyzing the information flow S300, wherein detecting data vulnerabilities further includes evaluating the information flow against the code security policy S302.

Block S200, which includes defining a code security policy, functions to specify rules that can be used in managing information flows. Information flow analysis preferably abstracts away and isolates the specific operational details. The high-level information flows preferably enable a generic security process to operate alongside the application and coordinate application operation with a specified security policy. In one implementation, defining a security policy S200 can specify data flow semantics, tagging directives, and flow descriptions. The data flow semantics and tagging directives are preferably applied as discussed above. Other suitable mechanics may be used in discovering security violations. Defining a security policy S200 may further include other rules and policies to be implemented or followed.

Data flow semantics (e.g., taint semantics) are preferably a low level description of how methods propagate (or taint) data. In a first example, from the cross-site scripting vulnerability example, defining a code security policy S200 may include a data flow semantic rule that specifies that a method transform propagates taint from its first input parameter to its first output parameter. Data-flow semantics can then be taken into account in the construction of the semantic code property graph as described above. They may subsequently be leveraged for data flow tracking.

Tagging directives are preferably rules for the detection of read and write operations, transformations, and attacker-controlled variables that are specified through tagging directives. In a second example, defining a code security policy S200 may include tagging directives applied to the semantic code property graph for use by the data flow tracker as described above, as well as in the construction of high-level information flows. In this second example the tagging directives may be leveraged to uncover the vulnerability of the running example, operations on standard Java input and output streams can be annotated with a tag.

In some preferred variations that include defining code security policy S200, the code security policy includes flow descriptions specifying patterns of information flow. The flow description of the security policy preferably specifies patterns of information flows that should be reported as possible instances of vulnerabilities. Thus, in this example, detecting data vulnerabilities comprises identifying the patterns of information flow as possible instances of vulnerability. In a third example, defining the code security policy S200 may include a flow description requirement, wherein information flows from HTTP requests to HTTP responses be required for discovery of a vulnerability.

Block S302, which includes evaluating the information flow against the code security policy, functions to analyze the information flows for particular identified patterns and/or rules. As described above, data flow semantics, tagging directives, and flow descriptions may be leveraged against the information flow to determine code vulnerabilities. The evaluation preferably matches the information flows against patterns specified in the flow description portion of the security policy. The security policy may thus specify how the information flows should be handled. As described above, the flow description of the code security policy may identify patterns of interest within the information flow. These patterns of interest may be generally reported, or the code security policy may additionally contain a rule on what should be done with the information flow that contains the pattern of interest.

In an example of the method, evaluating information flows can include performing a simulation of information flows, formulating constraints and reporting violation of constraints. As an example of this variation, for a semantic code property graph (V,E), a data flow d of length n is a sequence of nodes, that is, d=(v1, . . . , vn), with i∈V, for all i=1, . . . n. As the nodes of d represent propagation of data, they are arguments and formal parameters, including actual and formal return parameters. They will not be method nodes. The nodes of the SCPG are tagged, and for this example, are denoted the tags of the node v∈V as P(v). Additionally, each node is associated with either a method stub or call site, and are therefore associated with one method node. The tags of the method node associated with the node v are denoted as M (v).

In this case, flow execution can be executed according to the process description shown in FIG. 10. Building on this process for flow execution, each information flow can be translated into three tag sets: data tag set, source tag set, and sink tag set. The tag sets are preferably generated by recursive execution of descriptor flows Initially, descriptor flows of the write operations, read operations, and transformations are executed if present, preferably performed recursively. In other words, before executing a descriptor flow, a sink descriptor of its source is determined. For each sink descriptor, descriptor flows ending in the sink descriptor are executed. As a result, a set of source descriptor tags, a set of sink descriptor tags, and a set of transformation descriptor tags are created.

The descriptor tags for transformations can then be applied to the graph to account for them, and then the primary data flow executed. The result is a data tag set that is the resulting tag set calculated for the primary data flow's sink. The union of the method tags at the sink and the sink descriptor tags yields the sink tag set. Analogously, the union of method tags at the source and the source descriptor tags are the source tag set.

With the data tag set, source tag set, and sink tag set at hand, evaluation of information flows against flow descriptions can proceed. A flow description can provide one or more Boolean constraints for each of the three sets, thereby formulating requirements for the presence of tags in each of the three sets. If all of these Boolean constraints match, then the information flow matches the flow description. Other suitable conditions or Boolean logic may alternatively be specified.

In order to facilitate formulation of flow descriptions in an operator friendly manner, a language for flow description may be used. In the cross site scripting vulnerability example, a flow description can be specified in the language for cross site scripting vulnerabilities as employed to identify the vulnerable information flow as shown in FIG. 11. In this example flow description, the flow description declares that a cross-site scripting vulnerability exists if the source tag set contains the tag http, the data set does not contain the tag escaped, and it contains a tag named cnt with the value text-html, and finally, the sink tag set contains the tag http. Flow descriptors may be specified for any suitable condition.

3. System

Figure 12:
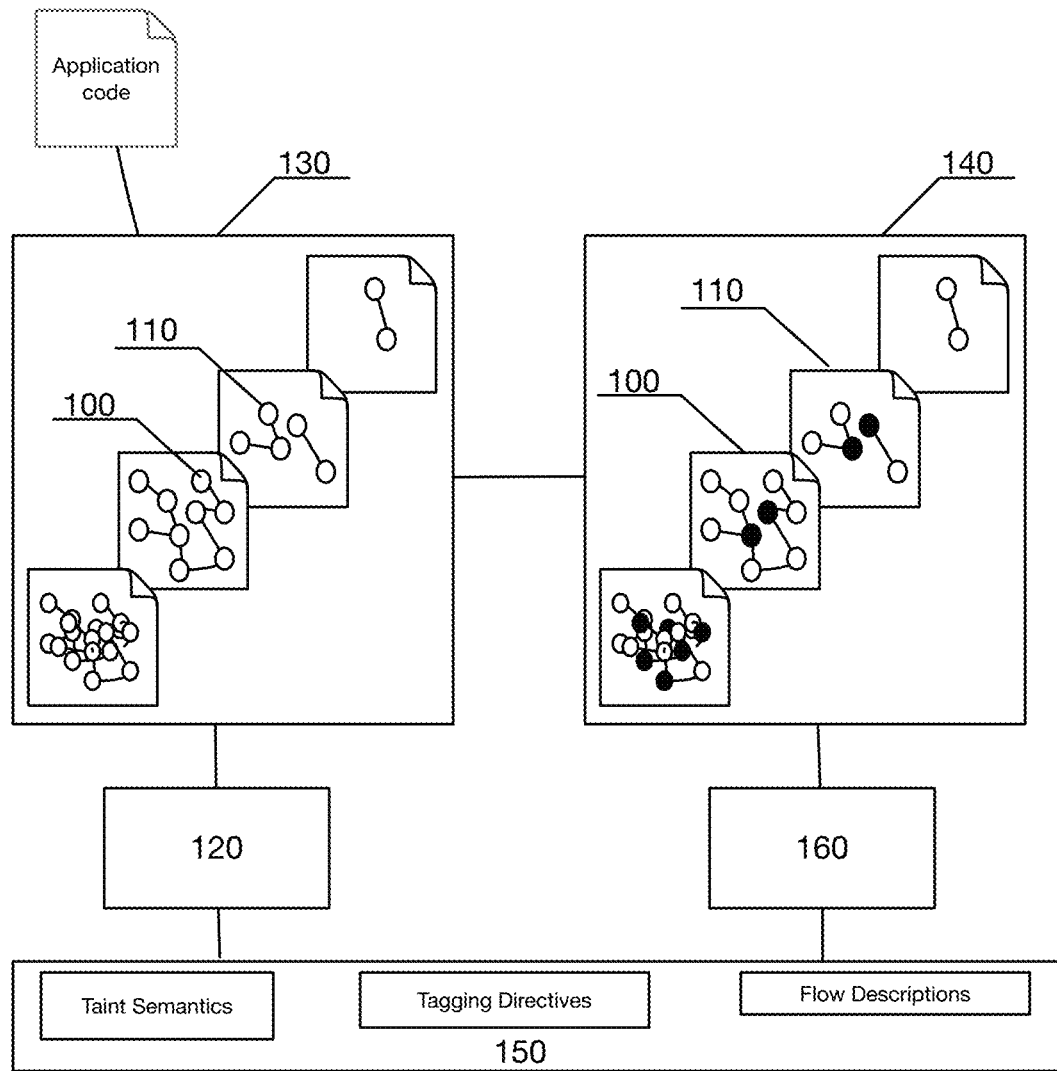
FIG. 12 is a schematic representation of a system of a preferred embodiment.

As shown in FIG. 12, a system for security analysis for data flow analysis of the application code that includes: data flows 100, wherein each data flow is a representation of the propagation of a set of data through the code base of the application code; information flows 110, a higher level interpretation of data flows wherein each information flow comprises multiple associated data flows; information flow extraction circuitry 120; a code property graph 130, a multi-layer storage data structure that stores flow data at different levels of abstraction; and a semantic code property graph 140, a multi-layer storage data structure generated from the code property graph that is a taggable and optimized version of the code base flows for analysis; a code security policy 150, comprising policies utilized in managing information flows; and information flow analysis circuitry 160.

The data flow 100 of a preferred embodiment is preferably a component of the system. Although typically considered an abstract concept, each data flow 100 may be considered a representation of the propagation of a set of data through the code base. For example, the series of function calls, transformations, write commands, read commands that use the set of data. In one preferred implementation, the data flow 100 may be represented using a data flow graph (DFG) that can trace the set of data from a source/input, to a sink/output. The data flow 100 may alternatively be represented in other desired fashion.

The information flow 120 is a higher-level representation of the data flow 100. Although the data flow 100 may be limited between an internal source and sink, the information flow 120 preferably includes a combination of data flows 100 to trace the set of a data from an initial "read" into the application to a final "write"/"return" of the application. In preferred variations, the information flow 120 combines multiple data flows 100 and call chains into a single logical flow that summarizes information about the set of data, the data source, data destination, and any transformations. In preferred variations, the information flow 120 includes a primary data flow that traces the set of data through the application code combined with associated sets of data that include sources, sinks, and transformations of the set of data. In preferred variations the information flow 120 comprises a primary data flow and may additionally comprise any number of descriptor flows associated with the primary flow. Alternatively, an information flow 120 may comprise of multiple primary data flows and any number of descriptor flows. FIG. 9 shows a schematic representation of the primary data flow, associated descriptor flows, and an associated call chain.

The primary data flow is the data flow 100 that traces the data set through the application code. The primary data flow could signify attacker-controlled data to a sensitive operation. The primary data flow includes a data source (e.g. output argument of a read operation or an exposed method), a data sink or an exposed output parameter (e.g. sink argument of a write operation), and a list of transformations (e.g. encryption).

For each element of the primary data flow, a determination of all (or at least the relevant) data flows 100 that end in any of its sink descriptors can be made. These data flows 100 configure the read, write, and/or transformations of the set of data.

Trigger call chains are identified by determining all call chains to the primary data flow. For the simplest case, the primary data flow starts at an exposed parameter, thereby having a single call chain for the exposed method. Alternatively, the data method may have any number of call chains.

The information flow extraction circuitry 120 of a preferred embodiment functions to detect and extract detected data flows 100 associated with a set of data and then to generate an information flow for that set of data. Thus in a preferred variation, the information flow extraction circuitry 120 may first identify a set of data that is attacker-controlled. Once the data is exposed data is identified, the information flow extraction circuitry 120 may trace primary data flow, and identify all sets of data associated with an element of the primary data flow and all call chains associated with the primary data flow. Once all these data are identified, descriptor flows are additionally traced. Once all data flows 100 are traced and call triggers identified, the information flow extraction circuitry 120 preferably combines the primary data flow, the associated descriptor flows, and associated call chains into an information flow.

The code property graph (CPG) 130 of a preferred embodiment functions as a data structure that stores data flows 100 at different levels of abstraction as complex graph structures. In preferred variations, data flows 100 are constructed fully, or in part, as a CPG 130. As shown in FIG. 4, the CPG 130 is preferably a joint data structure or model characterizing the code base.

More broadly, the CPG 130 involves a code profile abstraction. The code profile functions as a manifest interpretation of the components of the code, and data flows 100, that can have security and functional implications. The code profile is preferably generated from the CPG 130, but may be generated through other means. Code analysis and interpretation can detect certain parts of the code that have some implications on the data type, handling of data, and interactions with outside systems or code. The code profile can preferably be broken down into a set of components that in combination can encapsulate the attack surface of the code.

The code profile is preferably generated for a particular scope of the base code. But code profiles could additionally exist for subcomponents. For example, different classes or modules used in an application may have their own code profiles in addition or as an alternative to the code profile of the base code. A nested hierarchy of code profiles can enable someone to see how parts of a codebase impact a higher order code profile.

In variations where a CPG 130 is implemented for flow tracking, the CPG preferably enables efficient processing and analysis of the code base. The CPG 130 is preferably a serializable data structure which can enable efficient transmission and distribution of the code profile across various machines. Efficient transmission of the code profile may enable parallel processing of the CPG 130, which can be leveraged in efficient traversal of the CPG in analysis of interaction flows between various points of interest in the codebase. The CPG 130 can additionally be established for different segments of the codebase. For example, libraries and/or subcomponents of a codebase may each have a CPG 130.

As shown in FIG. 5, in some preferred variations the CPG 130 may comprise different "layers", wherein each layer characterizes the code base at a different level of abstraction. For example, in one implementation the CPG 130 may include a base layer, comprising individual data flows 100; a graph layer, comprising nodes data flow 100 links to the base layer; an information flow layer, comprising information flows; and a finding layer, comprising an analysis of the information flow layer. In one alternate variation the CPG 130 may have fewer or additional layers as desired. In a second alternate variation, each layer of the CPG 130 is a distinct and disjoint data structure. In a third alternate variation multiple CPGs 130 may be implemented, wherein each CPG provides analysis of a section of the code base. In this third variation, each CPG 130 may or may not overlap with other CPGs.

In one preferred implementation, the code property graph 130 is composed of an abstract syntax tree (AST), a control flow graph (CFG), and/or a data flow graph (DFG). Thus, constructing a code property graph 130 can include extracting an AST, a CFG, and a DFG from the code base; and then assembling the code property graph from AST, CFG, and DFG. In this preferred implementation, the AST, CFG, and DFG are each graphs that, in one implementation, can be joined through statement nodes. Alternatively, the code property graph 130 may be constructed of a DFG. This use of a code property graph 130 or a code related graph such as described herein are variations of possible implementations, and the method may alternatively make use of another suitable forms model of the code property graph or a code profile.

The semantic code property graph (SCPG) 140 of a preferred embodiment, functions as a multi-layer data structure generated, at least partially, from the CPG 130, that comprises a data-flow semantic abstraction of the CPG that is configurable (e.g. taggable) and optimized for the flow analysis. The SCPG 140 preferably functions to isolate the specification of the effects program statements have on data flow into configurable data flow semantics.

Similar to the code property graph, the SCPG 140 can combine multiple views of code into a single data structure. A SCPG 140 will preferably enhance the characterization of a code base through two aspects. First, the SCPG 140 interprets the original CPG 130 as the base layer of a multi-layered program representation, wherein each layer provides a more abstract view on the program code. Second, the SCPG 140 specifies with greater detail how program statements are represented in a level of detail sufficient to formulate an online data flow tracking algorithm on the graph. Additionally, the SCPG 140 may be tagged by applying tags to nodes of the graph.

The original CPG 130 is preferably constructed by merging abstract syntax trees, control flow graphs, and program dependence graphs into a joint representation, thereby providing a data structure for the discovery of code that conforms to constraints imposed on syntax, control flow and data flow 100. As one variation compared to the CPG 130, the SCPG 140 may not include a program dependence graph but alternatively merges ASTs and CFGs. In this variation, the desired information for online data flow tracking is included in the graph via summary edges induced by data flow semantics, thereby creating a self-contained graph for language-neutral data flow tracking.

Additionally, the control flow graph included in the SCPG 140 is preferably a control flow graph over call sites. That is, operations carried out by the program can be modeled as a function call sites, connected to method stubs of their callees. Preferably, the formal method signature of the callee can be represented by a designated node and an input and output parameter for each formal parameter. Finally, arguments and corresponding formal parameters are connected via directed edges to indicate passing of information from one to the other. As shown in FIG. 6, in one example a call site and method stub may model passing of parameter x to the function foo. The call site may include a designated node to represent the overall call and the return value. Additionally, two nodes in this example may represent the argument of x so as to represent the state of x prior to and after the function has been executed.

In one preferred variation, data flow semantics may be used in characterizing information in the code security policy 150 around how data (e.g., taint) is propagated from input parameters to output parameters to implement static data flow tracking.

A data flow semantic can be a three tuple (f,s,d) where f is a globally unique function identifier, and s identifies input parameters, and d identifies output/return parameters. The tuple indicates that, for the method f, taint is propagated from the input parameter s to the output parameter d. The data flow semantics are preferably the collection of these rules. In one variation a mini-language may be used to represent a data flow semantic rule, but a data flow semantics may be represented in any suitable manner. In one preferred implementation, the mini-language may be a custom Domain Specific Language (e.g. polyLang).

As an example, the cross-site scripting vulnerability example can be represented by data flow semantics. As shown in FIG. 6, the first line states that, if the first parameter (PAR1) of the DataInputStream constructor is tainted, then so is the instance output parameter (INST). The second line similarly states that taint of the first parameter of transform is propagated to the return value (RET). If the code of transform is available, then this summary may be calculated automatically and need not be specified by the user. If, however, the user feels that the transform carried out by transform is sufficient to remove attacker control, this line can be omitted and the flow from input to output stream will cease to exist. Analysis of the transform may be performed automatically. For example, various routine transforms such as encoding operations, hash operations, obfuscation operations, and/or any suitable type of transform may be recognized and automatically used to prevent a data security vulnerability.

The code security policy 150 of a preferred embodiment functions a set of rules/policies that can be used in managing information flows. The information flow analysis preferably abstracts away and isolates the specific operational details. The high-level information flows preferably enable a generic security process to operate alongside the application and coordinate application operation with a specified security policy. In one implementation, a security policy can specify data flow semantics, tagging directives, and flow descriptions. Other suitable mechanics may be used in discovering security violations.

The information flow analysis circuitry 160 of a preferred embodiment functions to analyze the information flow. The information flow analysis circuitry 160 preferably utilizes the information gained from the information flow, or set of information flows. In preferred variations the information flow analysis circuitry 160 analyzes the information flow to detect data vulnerabilities. The information flow analysis circuitry 160 may preferably function in conjunction with the code security policy 150, wherein the code security policy may include rules to help analyze the information flow. Alternatively, the information flow analysis circuitry 160 may determine certain patterns in the information flow leading to updates in the code security policy 150.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: detecting data flows in a code base, wherein detecting a data flow comprises tracking a set of data through the code base; and extracting an information flow, wherein the information flow is a high level flow description that exposes the application code vulnerabilities and is a combination of multiple data flows associated with a set of data. Other variations of the system and method above may be similarly applied.

Similarly, in another variation, a non-transitory computer-readable medium storing instructions that, when executed by one or more computer processors of a communication platform, cause the communication platform to perform operations of the system or method described herein such as: detecting data flows in a code base, wherein detecting a data flow comprises tracking a set of data through the code base; and extracting an information flow, wherein the information flow is a high level flow description that exposes the application code vulnerabilities and is a combination of multiple data flows associated with a set of data. Other variations of the system and method above may be similarly applied.

Figure 13:
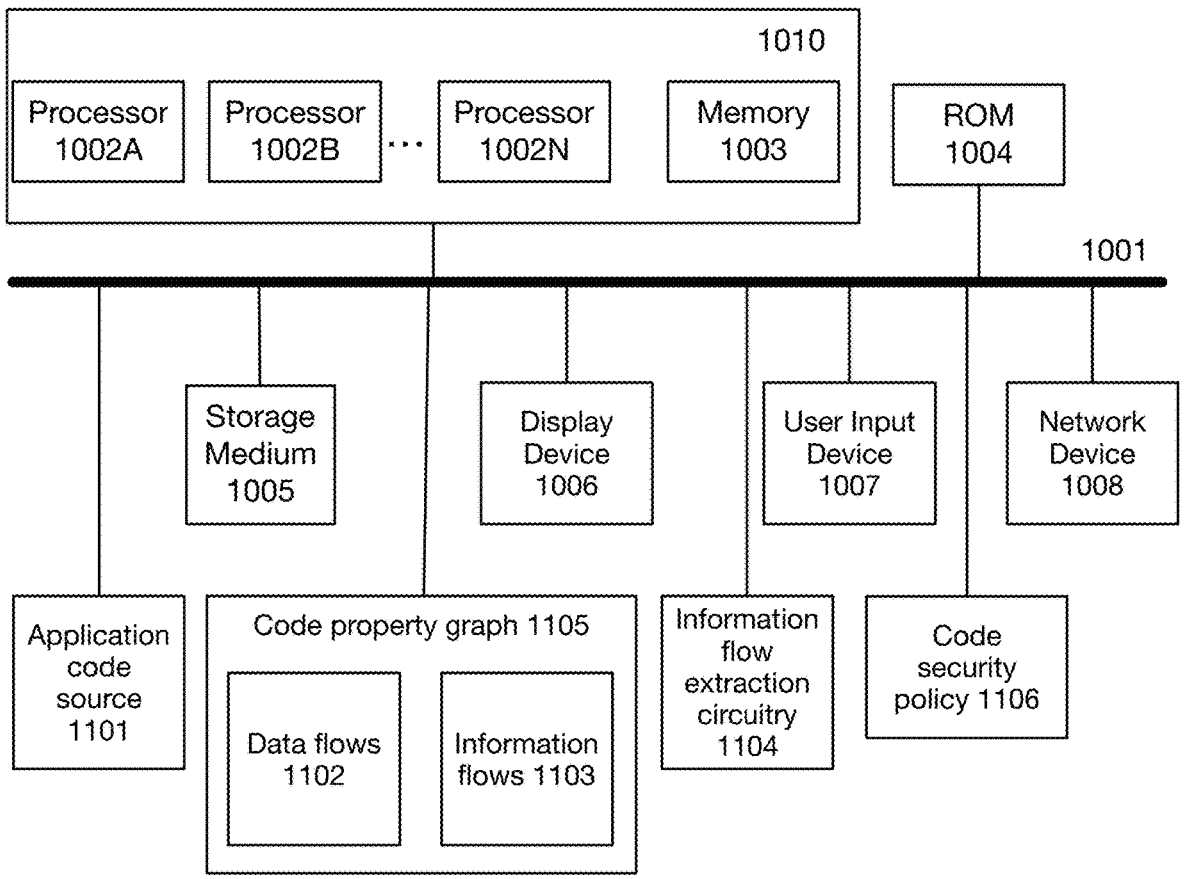
FIG. 13 is an exemplary system architecture that may be used in implementing the system and/or method.

FIG. 13 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1202N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting with, storing or otherwise interacting with application code source 1101, data flows 1102, information flows 1103, information flow extraction circuitry 1104, a code property graph 1105, a code security policy 1106, and/or other suitable computing devices or data sources.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1201A-1201N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1205 can include an operating system, software programs, device drivers, and/or other suitable sub-systems or software.

As a person skilled in the art will recognize from the previous detailed description and from the figures and claims, modifications and changes can be made to the embodiments of the invention without departing from the scope of this invention as defined in the following claims.

We claim:

1. A method for security analysis of application code comprising:
   generating a code property graph and detecting, by at least one computer using the code property graph, data flows in a code base, wherein detecting a data flow comprises tracking a set of data through the code base;
   extracting, by at least one computer, an information flow, comprising:
      finding a primary data flow by identifying a data flow that contains exposed data,
      extending the primary data flow through descriptor data flows,
      wherein the descriptor data flows are associated with the set of data tracked by the primary data flow, the descriptor data flows comprising data flows associated with at least one of a source or a destination of the primary data flow; and
      wherein the information flow is a high-level flow description that exposes code vulnerabilities based on the primary data flow and all associated descriptor flows.

2. The method of claim 1, wherein the descriptor data flows further comprises data flows associated with transformations of the primary data flow.

3. The method of claim 1, further comprising extracting a set of information flows, wherein for each information flow, extracting an information flow comprises:
   finding a primary data flow by identifying a data flow that contains exposed data, and extending the primary data flow through descriptor data flows, wherein the descriptor data flows are associated with the set of data tracked by the primary data flow.

4. The method of claim 1, further comprising analyzing the information flow, comprising detecting data vulnerabilities, wherein detecting data vulnerabilities identifies locations in code base, types, and levels of exposure of the data vulnerabilities.

5. The method of claim 4, further comprising defining a code security policy, wherein the code security policy comprises flow descriptions specifying patterns of information flow, and wherein detecting data vulnerabilities comprises identifying the patterns of information flow as possible instances of vulnerability.

6. The method of claim 1, wherein the data flows and the information flows are stored in a single graph data structure.

7. The method of claim 6, where the graph data structure further stores detected data vulnerabilities.

8. The method of claim 7, further comprises tagging nodes of the graph data structure representing functions and parameters associated with read operations, write operations, and transformations of the set of data.

9. The method of claim 7, further comprises tagging nodes of the graph data structure representing functions and parameters associated with vulnerabilities.

10. The method of claim 1, further comprising:
defining a code security policy, wherein the code security policy comprises data flow semantic policies, tagging directive policies, and flow description policies;
analyzing the information flow, comprising evaluating the information flow against the code security policy and detecting data vulnerabilities,
wherein generating the code property graph comprises generating a semantic code property graph, wherein the semantic code property graph is a multi-layer data structure that stores the application flow data at different abstraction levels at a detail sufficient to formulate an online data flow tracking algorithm on the graph, comprising at least a base layer, a graph layer comprising data flows, an information flow layer comprising information flows, and a findings layer comprising an analysis of the information flow layer; and
wherein extracting an information flow further comprises: using the data flow semantic policies in identifying the primary data flow, and extending the information data flow through associated chain calls.

11. A system comprising of:
one or more computer-readable mediums storing instructions that, when executed by the one or more computer processors, cause a computing platform to perform operations comprising:
generating a code property graph and determining, using the code property graph, a primary data flow by identifying a data flow that contains exposed data,
extending the primary data flow through descriptor data flows,
wherein the descriptor data flows are associated with the set of data tracked by the primary data flow, the descriptor data flows comprising data flows associated with at least one of a source or a destination of the primary data flow; and
wherein the information flow is a high-level flow description that exposes code vulnerabilities based on the primary data flow and all associated descriptor flows.

12. The system of claim 11, wherein the descriptor data flows further comprises of data flows associated with a transformation of the primary data flow.

13. The system of claim 11, wherein the instructions further cause operations on the computing platform comprising: storing instructions in the computing platform to perform operations further comprising analyzing the information flow, comprising detecting data vulnerabilities, wherein detecting data vulnerabilities identifies locations in code base, types, and levels of exposure of the data vulnerabilities.

14. The system of claim 13, wherein the instructions further cause operations on the computing platform comprising: defining a code security policy, wherein the code security policy comprises flow descriptions specifying patterns of information flow, and wherein detecting data vulnerabilities comprises identifying the patterns of information flow as possible instances of vulnerability.

15. The system of claim 1, wherein the data flows and the information flows are stored in a single graph data structure.

16. The system of claim 15, where the graph data structure further stores detected data vulnerabilities.

17. The system of claim 16, wherein the instructions further cause operations on the computing platform comprising: tagging nodes of the graph data structure representing functions and parameters associated with read operations, write operations, and transformations of the set of data.

18. The system of claim 16, wherein the instructions further cause operations on the computing platform comprising: tagging nodes of the graph data structure representing functions and parameters associated with vulnerabilities.

19. The system of claim 11, wherein the instructions further cause operations on the computing platform comprising:
defining a code security policy, wherein the code security policy comprises data flow semantic policies, tagging directive policies, and flow description policies;
analyzing the information flow, comprising evaluating the information flow against the code security policy and detecting data vulnerabilities,
generating a semantic code property graph, wherein the semantic code property graph is a multi-layer data structure that stores the application flow data at different abstraction levels at a detail sufficient to formulate an online data flow tracking algorithm on the graph, comprising at least a base layer, a graph layer comprising data flows, an information flow layer comprising information flows, and a findings layer comprising an analysis of the information flow layer; and
wherein extracting an information flow further comprises: using the data flow semantic policies in identifying the primary data flow, and extending the information data flow through associated chain calls.

20. A non-transitory computer-readable medium storing instructions that, when executed by one or more computer processors of a communication platform, cause the communication platform to:
generate a code property graph and detect, using the code property graph, data flows in a code base, wherein each data flows comprises a set of data that is tracked through the code base;
extract an information flow that comprises:
determining a primary data flow by identifying a data flow that contains exposed data,
extending the primary data flow through descriptor data flows, wherein the descriptor data flows are associated with the set of data tracked by the primary data flow, the descriptor data flows comprising data flows associated with at least one of a source or a destination of the primary data flow; and wherein the information flow is a high-level flow description that exposes code vulnerabilities based on the primary data flow and all associated descriptor flows.

\* \* \* \* \*